United States Patent
Tan et al.

(10) Patent No.: US 8,836,728 B2
(45) Date of Patent: Sep. 16, 2014

(54) TECHNIQUES TO MAGNIFY IMAGES

(75) Inventors: Linda Tan, San Bruno, CA (US); Julian Lau, San Mateo, CA (US)

(73) Assignee: CBS Interactive, Inc., New York, NY (US)

( * ) Notice: Subject to any disclaimer, the term of this patent is extended or adjusted under 35 U.S.C. 154(b) by 702 days.

(21) Appl. No.: 13/037,067

(22) Filed: Feb. 28, 2011

(65) Prior Publication Data

US 2012/0218468 A1  Aug. 30, 2012

(51) Int. Cl.
*G09G 5/00* (2006.01)
*H04N 21/4545* (2011.01)

(52) U.S. Cl.
CPC .............................. *H04N 21/45455* (2013.01)
USPC ........................................................ 345/660

(58) Field of Classification Search
USPC ....................................................... 345/660
See application file for complete search history.

(56) References Cited

U.S. PATENT DOCUMENTS

| 2002/0055891 A1* | 5/2002 | Yang .............................. 705/27 |
| 2006/0200308 A1* | 9/2006 | Arutunian ..................... 701/208 |
| 2010/0050221 A1* | 2/2010 | McCutchen et al. .......... 725/109 |

* cited by examiner

Primary Examiner — Kee M Tung
Assistant Examiner — Haixia Du
(74) Attorney, Agent, or Firm — Kacvinsky Daisak Bluni PLLC

(57) ABSTRACT

Techniques to magnify images are described. An apparatus may comprise a media application that when executed by a processor is operative to present video information including images on a display. The media application may comprise a zoom control component operative to receive a zoom control directive to magnify an image portion of an image, increase a video resolution level for the image portion of the image, and magnify the image portion to form an enhanced magnified image. Other embodiments are described and claimed.

15 Claims, 8 Drawing Sheets

200

PRESENT VIDEO INFORMATION INCLUDING IMAGES ON A DISPLAY
202

RECEIVE A ZOOM CONTROL DIRECTIVE TO MAGNIFY AN IMAGE PORTION OF AN IMAGE
204

INCREASE A VIDEO RESOLUTION LEVEL FOR THE IMAGE PORTION OF THE IMAGE
206

MAGNIFY THE IMAGE PORTION TO FORM AN ENHANCED MAGNIFIED IMAGE
208

PRESENT INFORMATION ABOUT THE ENHANCED MAGNIFIED IMAGE ON THE DISPLAY
210

*FIG. 2*

TECHNIQUES TO MAGNIFY IMAGES

BACKGROUND

With the rise of electronic commerce, sometimes referred to as "e-commerce," it is becoming increasingly common for a consumer to shop for new products from online or digital stores. A paradigm shift has occurred from physical shopping to virtual shopping, and is gaining momentum as technology innovations are eliminating barriers of speed, location and complexity. Given a computer and network connection, a consumer can quickly find volumes of product information to educate them on product features, pricing and alternatives, and purchase a product for delivery to a convenient location. This progression is driving innovation around how digital stores market products to consumers. Websites are using multimedia content to deliver product information, including streaming high definition (HD) video, HD audio, animations, tactile feedback, olfactory feedback, and other sensory modalities. These and other techniques are implemented in an attempt to create a virtual shopping experience that closely mimics a physical shopping experience in a physical store. Despite these improvements, a consumer still has difficulty in examining a product in a digital store with the same level of control and detail as a physical store. For instance, a consumer cannot pick up a product and examine it from different angles, look closely at an interesting feature of a product, and otherwise physically manipulate the product. Further, it may be difficult to ascertain consumer interest and questions in a digital store since there is no human interaction. It is with respect to these and other considerations that the present improvements have been needed.

BRIEF DESCRIPTION OF THE DRAWINGS

FIG. 2 illustrates an embodiment of a logic flow for the system of FIG. 1.

DETAILED DESCRIPTION

Figure 1:
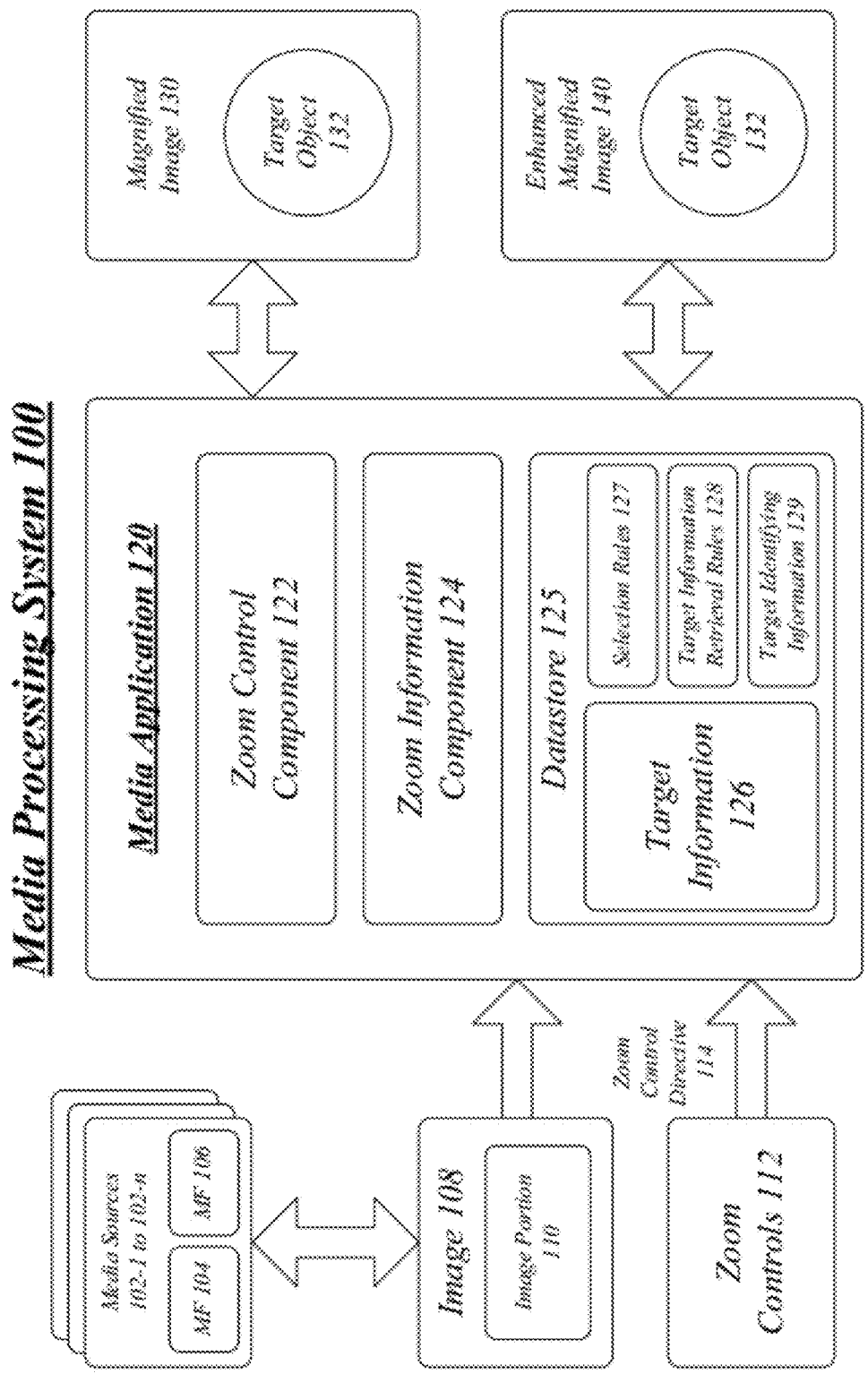
FIG. 1 illustrates an embodiment of a multimedia processing system.

Various embodiments are generally directed to managing multimedia content. Some embodiments are particularly directed to techniques to magnify digital images with a greater level of detail and resolution. Other embodiments are directed to ascertaining consumer interest in a product or product feature based on zoom operations, and presenting additional information and options about the product or product feature based on the consumer interest.

When attempting to market or sell a product, or otherwise deliver product information, a digital store may provide multimedia content at higher levels of quality and fidelity. For example, a website may offer product information using high-definition (HD) video or even extreme HD (XHD) video. HD and XHD video have a resolution substantially higher than traditional video. However, delivering such high quality multimedia content has a number of trade-offs, including requiring more communications bandwidth and latency in transmitting content to a device, and higher processing requirements to present the content. As a result, some websites offer multimedia content at varying levels of resolution, with a lower level of resolution decreasing bandwidth and processing requirements, and a higher level of resolution increasing such parameters.

When delivering multimedia content at a lower level of resolution, however, a problem occurs when magnifying a digital image. Magnification techniques, such as image scaling, are limited by a native resolution for the image. As an image is magnified, objects within the image become blurred and pixilated, with edges of an object taking on a jagged rather than smooth effect. This is particularly problematic for multimedia content designed to present product information. A viewer may desire to examine more closely a product or a product feature as part of a purchase decision, and may attempt to zoom or magnify a digital image for a closer look. This leads to an unsatisfying viewing experience when magnifying lower quality video content.

To solve these and other problems, embodiments attempt to automatically increase a video resolution level for multimedia content, such as a two-dimensional or three-dimensional digital image from a video, in response to zoom control directives. In one embodiment, for example, a media application is arranged to present video information including images on an electronic display. The media application may comprise, or invoke, a zoom control component arranged to receive a zoom control directive to magnify a selected image portion of a digital image. The zoom control component may increase a video resolution level for the image portion of the image. For instance, the zoom control component may replace the image having a lower level of resolution with an image having a higher level of resolution prior to magnification. The zoom control component may then magnify the image portion of the image with a higher level of resolution to form an enhanced magnified image. As a result, a viewer may examine an object in the image with a greater level of detail, thereby leading to a superior viewing experience and informed purchase decision. Other embodiments are described and claimed.

Further, digital stores suffer from receiving information or feedback from a potential purchaser. A physical store typically employs sales people trained to discern verbal and non-verbal cues of a consumer, and provide additional information about a product or competing product based on such cues. For such information, a digital store relies upon explicit information provided by a consumer via some input device, such as typing a question, activating a link, or navigation commands. Despite attempts to infer consumer intent, behavior or patterns from consumer inputs, one category of consumer input that has been largely ignored is zoom or magnification operations. In the context of a digital store or purchase decision, which may include educational materials about a product to make informed choices, zoom operations may provide a clue as to current consumer interest, similar to those cues provided in a human sales interaction. In particular, zoom operations or magnification operations of images that take place during viewing of a video for a product may provide an entirely new class of user intent information.

To solve these and other problems, embodiments attempt to automatically or manually provide additional information about a target object based on zoom operations. In one embodiment, for example, a media application is arranged to present video information including images on an electronic display, such as images taken from a video of a consumer product. The media application may comprise, or invoke, a zoom control component arranged to receive a zoom control directive to magnify a selected image portion of a digital image, and produce an enhanced magnified image. Further, the media application may comprise, or invoke, a zoom information component operative to present information about a target object within the enhanced magnified image on the display. For instance, the zoom information component may select a target object from among multiple objects presented in the enhanced magnified image, retrieve target information related to the target object, and present the target information adjacent, adjoining or overlaid on the target object. An example of target information may include an advertisement for a digital or physical store, product specifications, dialogs soliciting further user input for a search engine, and other types of information. In this manner, zoom operations can be used to search, retrieve and present information about objects contained within a magnified image or enhanced magnified image. Other embodiments are described and claimed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

In various embodiments, system 100 may comprise a media processing system having one or more media sources 102-n, where n represents any positive integer. Media sources 102-n may comprise any media source capable of sourcing or delivering media information and/or control information to media application 120. More particularly, media sources 102-n may comprise any media source capable of sourcing or delivering digital audio and/or video (AV) signals to media application 120. Examples of media sources 102-n may include any hardware or software element capable of storing and/or delivering media information, such as a Digital Versatile Disk (DVD) device, a Video Home System (VHS) device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, web site, web server, web application, web service, media server, communications server, and so forth. Other examples of media sources 102-n may include media distribution systems to provide broadcast or streaming analog or digital AV signals to media application 120. Examples of media distribution systems may include, for example, Over The Air (OTA) broadcast systems, terrestrial cable systems (CATV), satellite broadcast systems, and so forth. It is worthy to note that media sources 102-n may be internal or external to media application 120, depending upon a given implementation. The embodiments are not limited in this context.

In various embodiments, the incoming video signals received from media sources 102-n may have a native format, sometimes referred to as a visual resolution format. Examples of a visual resolution format include a standard definition television (SDTV) format, a digital television (DTV) format, an enhanced definition television (EDTV) format, a high definition television (HDTV) format, progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720 p), which refers to 720 vertical pixels and 1280 horizontal pixels (720× 1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context.

In various embodiments, media processing system 100 may comprise a media application 120 to connect to media sources 102-n over one or more communications media. Media application 120 may comprise any software application that is arranged to process media information received from media sources 102-n. For instance, the media application 120 may comprise a media application designed to present video information or A/V information. In one embodiment, for example, media application 120 may be implemented on an electronic device, such as a notebook computer, a laptop computer, an ultra-laptop computer, a portable computer, a handheld computer, a personal digital assistant (PDA), a cellular telephone, a combination PDA/cellular telephone, a smart phone, a tablet, and so forth. Additional examples of suitable electronic devices are described with reference to FIG. 7, although the embodiments are not limited in this context.

In one embodiment, a media source 120-1 and the media application 120 may interoperate to source and reproduce multimedia information for electronic commerce. For instance, the media source 120-1 may comprise or be implemented as a web server or web site arranged to deliver web pages having product information suitable for electronic commerce, such as sold by a digital store, for example. The media source 120-1 may deliver, upon request, multimedia information about a product through the media application 120. For instance, a user may request playback of video information or A/V information concerning a given product. The media source 120-1 may download or stream the video information (or A/V information) to the media application 120 for presentation on an electronic display. The media application 120 may present the video information on a display, and provide a set of media controls to manage playback, such as play, pause, stop, fast forward, rewind, and so forth.

In addition to conventional media controls, the media application 120 may further provide a set of zoom controls 112 to allow a user to control zoom operations for video information presented by the media application 120. For instance, a zoom control 112 may comprise a zoom magnify control operative to magnify or enlarge video information presented by the media application 120, such as an image portion 110 of an image 108. The image 108 may comprise, for example, a frame of video information. A given frame may be selected by a user using the media controls, such as a "pause" control, for example. Additionally or alternatively, the image 108 may comprise a picture, a computer-generated graphic (CGI) image, or some other type of image. In another example, a zoom control 112 may comprise a zoom reduction control operative to diminish or reduce the image portion 110 of the image 108. Activation of a zoom control 112 may issue a zoom control directive 114 to a zoom control component 122 of the media application 120. The zoom control component 122 may to magnify or reduce a selected image portion 110 of the image 108 in accordance with a given zoom control directive.

In one embodiment, for example, the zoom control component 122 may receive a zoom control directive 114 to magnify an image portion 110 of the image 108 from the zoom controls 112. The zoom control component 122 may then magnify the image portion 110 of the image 108 in response to the zoom control directive to form a magnified image 130.

The zoom control component 122 may generate a magnified image 130 in a number of different ways. For instance, the zoom control component 122 may use various digital image scaling techniques to resize the image portion 110. Image scaling is a process that involves a trade-off between efficiency, smoothness and sharpness. As the size of the image portion 110 is increased, the pixels which comprise the image portion 110 become increasingly visible, thereby making the image appear visually "soft" or "fuzzy." Image size may be increased using various upsampling or interpolating techniques, for example. Conversely, reducing an image will tend to enhance its smoothness and apparent sharpness. Image size may be decreased using various subsampling or downsampling techniques, for example.

When performing zoom operations for a digital image, however, it is not possible to discover any more information in an image 108 than already exists, and therefore image quality inevitably suffers. The zoom control component 122 may use various magnification techniques to increase a number of pixels that the image portion 110 contains, which evens out the appearance of the original pixels. For instance, a nearest-neighbor interpolation algorithm replaces every pixel with a greater number of pixels (e.g., four) of the same color. The resulting image is larger than the original, and preserves all the original detail, but has undesirable jaggedness around edges of objects. Other scaling methods are better at preserving smooth contours in the image. For example, linear (or bilinear, in two dimensions) interpolation is typically better than the nearest-neighbor system for changing the size of an image, but causes some undesirable softening of details and can still be somewhat jagged. Bicubic interpolation provides better results, although some jaggedness still remains. Pixel art scaling algorithms such as High Quality Magnification (hqx) produce sharper edges while maintaining high levels of detail, particularly when higher factor filters are used (e.g., hq2×, hq3×, hq4×, etc.). Anti-aliasing algorithms, such as supersampling, may also be used for scaling photos and raster images with many colors.

Although the zoom control component 122 may use these or other magnification techniques to produce a magnified image 130, the zoom control component 122 is still limited by the original resolution of the image 108 and the image portion 110. In some cases, however, a viewer may desire to have a higher level of detail, sharpness and smoothness of image features or objects within the magnified image 130. For instance, a viewer may like to study a specific target object 132 or feature of the target object 132 within the magnified image 130, and conventional magnification techniques may be insufficient to allow such close inspection. As previously described, this may be desirable when a consumer is determining whether to purchase a product, for example.

To circumvent the limitations of the original image 108 and the image portion 110, the zoom control component 122 may be arranged to increase a video resolution level of the magnified portion of the image 130. Media sources 120-$n$ may be capable of delivering video information at various levels of fidelity or resolution. For instance, a media source 102-1 may have multiple media files sourcing a same set of video information, such as media file 104 and media file 106. The media file 104 may store lower resolution video information (e.g., SDTV) of a given content while the media file 106 may store higher resolution video information (e.g., HDTV) of the same content. Additionally or alternatively the media file 106 may store higher resolution video information utilizing video capture techniques to capture details of an object from all sides of the object. For instance, a digital video camera may capture video information for an object by rotating around the object in all 3 axes of the XYZ space, with particular focus on the object from varying distances, angles and perspectives. Such video capture techniques would enhance the different types of images 108 that can be closely examined by the zoom control component 122.

In some cases, the media source 102-1 may be designed to source lower resolution video information due to bandwidth constraints of a delivery network or receiving device, cost considerations, user selection, and so forth. When a user utilizes the zoom controls 112 to magnify an image 108 having a lower resolution level (e.g., SDTV), the zoom control component 122 may substitute or replace the image 108 with a version having a higher resolution level (e.g., HDTV). The zoom control component 122 may then use various magnification techniques to produce an enhanced magnified image 140 having a greater amount of detail, smoothness and sharpness relative to a magnified image 130 due to the higher native resolution level.

In addition to enhancing a video resolution level, such as by switching between an image with a lower video resolution to an image with a higher video resolution, the zoom control component 122 may also switch an image from a two-dimensional (2D) image to a three-dimensional (3D) image. For instance, an image 108 may comprise a 2D computer graphics representation of geometric data having a relatively flat perspective, and when a user utilizes the zoom controls 112 to magnify the image 108, the zoom control component 122 may substitute or replace the image 108 with a 3D version having a 3D computer graphics representation of geometric data. Any type of 3D imaging techniques may be used, including holography, stereoscopy, autostereoscopy, orthographic projections, and so forth. The embodiments are not limited in this context.

A viewer may control, manage or otherwise manipulate various aspects of an enhanced magnified image 140 to more fully examine details of a target object 132 within the enhanced magnified image 140. For instance, a viewer may perform a closer examination of external features of a smart phone, such as a keyboard, screen, input/output (I/O) ports, antennas, and other external features. If a viewer wants to examine a target object 132 from a different angle, the viewer may manipulate the playback controls for the video information until a desired image is presented on a display, pause the video information to present the desired image 108, and then use the zoom controls to produce another enhanced magnified image 140 at the desired viewing angle. A viewer may utilize the same procedures to examine different product features, such as capturing and zooming in on a keyboard for a notebook computer, a fabric pattern for a chair, or a front grill of an automobile.

In addition to the media application 120 producing a magnified image 130 and/or an enhanced magnified image 140, the media application 120 may also use zoom operations as a trigger to provide additional information about objects captured within the magnified image 130 and/or the enhanced magnified image 140. In one embodiment, for example, the media application 120 may include a zoom information component 124 arranged to present different types of information about a target object 132 within the magnified image 130 and/or the enhanced magnified image 140 on a display. Operations of the zoom information component 124 are further described with reference to the enhanced magnified image 140 for purposes of clarity. It may be appreciated, however, that the zoom information component 124 may perform similar operations for target objects 132 captures within a magnified image 130. The embodiments are not limited in this context.

Once the zoom control component 122 receives a zoom control directive 114, and magnifies an image portion 110 for an image 108 to produce an enhanced magnified image 140, the zoom information component 124 may select a target object 132 presented within the enhanced magnified image 140. The zoom information component 124 may retrieve target information 126 for the selected target object 132 within the enhanced magnified image 140 based on a set of target information retrieval rules 128.

The target information 126 may comprise any type of information relevant to the target object 132. Examples of target information 126 may include without limitation an advertisement related to the target object 132, metadata for the target object, a product description for the target object, a dialog soliciting user commands such as search terms for a search engine, product specifications, product feature specifications, similar products, alternate products, product reviews, and any other type of information associated with a target object 132. The embodiments are not limited in this context.

The zoom information component 124 may retrieve target information 126 for the selected target object 132 within the enhanced magnified image 140 from a datastore 125. As shown in FIG. 1, the datastore 125 may comprise a local datastore implemented with the media application 120. Additionally or alternatively, the datastore 125 may comprise a remote datastore implemented by another application or device (e.g., a server). For instance, a remote datastore may be implemented by an advertising server, a search server, a communications server, a web server, and so forth.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may present video information including images on a display at block 202. For example, the media application 120 may receive streaming video information from a media source 102-1, such as from the media file 104, and present the streaming video information on an electronic display for a viewer.

The logic flow 200 may receive a zoom control directive to magnify an image portion of an image at block 204. For example, the zoom control component 122 of the media application 120 may receive a pause control directive to pause the flow of streaming video information from the media source 102-1, and when paused, present an image 108 from among the succession of images forming the streaming video information. A user may select an image portion 110 of the image 108 for magnification using the zoom controls 112, which may comprise or implement an input device (e.g., a mouse, finger gestures, etc.) and any number of selection techniques (e.g., drawing a box using a pointing device). The zoom controls 112 may generate a zoom control directive 114 to magnify the image portion 110 of the image 108.

The logic flow 200 may increase a video resolution level for the image portion of the image at block 206. For example, the zoom control component 122 may send a request to the media source 102-1 to see if there is a version of the image 108 having a higher level of resolution. The request may include identifying information for the image 108, such as a unique image identifier for the image 108, a time stamp of when the image 108 was presented within the stream of video information, and so forth. The media source 102-1 may receive the request, determine that the media file 106 has a higher level of resolution than the current streaming version provided by the media file 104, and use the identifying information to locate, retrieve and forward a higher resolution level version of the image 108 to the zoom control component 122. The zoom control component 122 may replace the lower level resolution version of the image 108 with the higher level resolution version of the image 108 prior to performing an image scaling operations to magnify the image 108, thereby increasing a base resolution level and corresponding results achieved using various magnification techniques.

In some cases, the zoom control component 122 may not have access to any identifying information for the image 108. In such cases, the zoom control component 122 may send the actual image 108 to the media source 102-1, and the media source 102-1 may implement a high-speed matching algorithm to search the media file 106 for an image in the media file 106 that matches the image 108 of the media file 104. Additionally or alternatively, the zoom control component 122 may request a download of the media file 106, and utilize a high-speed matching algorithm itself to search for a matching image.

The logic flow 200 may magnify the image portion to form an enhanced magnified image at block 208. For example, the zoom control component 122 may substitute the lower resolution level version of the image 108 with the higher resolution level version of the image 108, and determine the image portion 110 within the higher resolution version of the image 108. The zoom control component 122 may then magnify the image portion 110 to form an enhanced magnified image 140. The zoom control component 122 may magnify the image portion 110 using any number of image scaling techniques, including upsampling and interpolation techniques, for example.

The logic flow 200 may present information about the enhanced magnified image on the display at block 210. For example, the zoom information component 124 may select a target object 132 within the enhanced magnified image 140, retrieve target information 126 from the datastore 125, and present the target information 126 on the display concurrently with the enhanced magnified image 140. For instance, the zoom information component 124 may overlay the target information 126 on or near the target object 132 with varying levels of transparency or translucency, or in a separate GUI window, browser window, web page, and so forth.

The zoom information component 122 may select a target object 132 presented within the enhanced magnified image 140 in a number of different ways. In one embodiment, the zoom information component 122 may use a set of selection rules 127 to select the target object 132.

The zoom information component 122 may detect objects captured within the enhanced magnified image 140 using various image processing techniques, such as morphology or color processing techniques. For example, the zoom information component 122 may implement a mathematical morphology (MM) technique to analyze and process geometrical structures, based on set theory, lattice theory, topology, and random functions. Topological and geometrical continuous-space concepts such as size, shape, convexity, connectivity, and geodesic distance, can be characterized by MM on both continuous and discrete spaces. A MM technique may form the foundation of morphological image processing, which consists of a set of operators that transform images according to the above characterizations.

Once the zoom information component 122 detects one or more objects within the enhanced magnified image 140, the zoom information component 122 may automatically select one of the detected objects as a target object 132 using the selection rules 127. For instance, a selection rule 127 may be used to select a target object 132 based on spatial proximity to a reference point in the image 108, such as a target object 132 closest to a center point for the enhanced magnified image 140. In other examples, selection rules 127 may be used to select a target object 132 based on an object color, object size, object shape, object coordinates, and so forth. It may be appreciated that other selection rules 127 may be used for a given implementation, and the embodiments are not limited in this context.

The zoom information component 122 may also select one of the detected objects as a target object 132 in response to user commands. For instance, the zoom information component 122 may generate and present a user interface view to request selection of a target object 132 presented within the enhanced magnified image 140. The user interface view may present various user interface controls to assist a user in selecting a given detected object as the target object 132. For instance, the zoom information component 122 may highlight each of the detected objects within an enhanced magnified image 140, such as using a visual indicator such as outlining each object with a bright or colored border, and provide a set of navigation controls allowing a user to switch between the outlined objects until settling on a desired target object 132. The zoom information component 122 may receive a selection control directive representing a user command, and select a target object presented within the enhanced magnified image based on a selection control directive.

Once a target object 132 has been automatically or manually selected from the enhanced magnified image 140, the zoom information component 124 may retrieve target information 126 for a selected target object 132 within the enhanced magnified image 140. The zoom information component 124 may retrieve the target information 126 from the datastore 125 implemented as either a local datastore or a remote datastore (e.g., a server accessed via a network).

In one embodiment, the zoom information component 124 may retrieve target information 126 for a selected target object 132 within the enhanced magnified image 140 based on a set of target information retrieval rules 128. The target information retrieval rules 128 may define behavior for the zoom information component 124 and identify a particular type of information and associated presentation format for display with the target object 132. For instance, a target information retrieval rule 128 may be defined to cause a certain type of target information 126 to be retrieved from the datastore 125, such as advertising information or product information. In another example, a target information retrieval rule 128 may cause retrieval of target information 126 about a certain feature or part of the target object 132. Assume a target object 132 is a notebook computer. A target information retrieval rule 128 may cause retrieval of target information 126 about one or more components of a notebook computer, such as a screen display, a keyboard, input/output (I/O) ports, peripheral devices, battery, and other components of the notebook computer. In yet another example, a target information retrieval rule 128 may cause retrieval of a certain amount of information, such as a first x sentences of a product description, where x represents a positive integer. It may be appreciated that other target information retrieval rules 128 may be used for a given implementation, and the embodiments are not limited in this context.

When retrieving target information 126 for a given target object 132, the zoom information component 124 may use target identifying information 129 for the target object 132. Once the zoom information component 124 detects and selects a target object 132, the zoom information component 124 may attempt to identify the target object 132. For instance, the zoom information component 124 may compare the target object 132 to other objects stored in a data library, such as a product catalog, for example. The product catalog may include identifying information for objects stored in the product catalog, such as metadata describing a product name, a part number, a store-keeping unit (SKU) number or code, and so forth. The zoom information component 124 may also search public and private websites for comparable objects. When a matching object is found, the zoom information component 124 may retrieve metadata for the matched object, such as a product name, and use the metadata as target identifying information 129. The zoom information component 124 may use the target identifying information 129 to search and retrieve target information 126 for the target object 132.

In some implementations, rather than automatically retrieving target information 126, the zoom information component 124 may generate a user interface view to present a request for retrieval of target information 126 about a selected target object 132 presented within the enhanced magnified image 140. For instance, the user interface view may provide dialog prompts asking a user whether they would like any additional information about the target object 132. The dialog prompts may also request what type of additional information is desired by a user, such as advertising information, product information, product feature information, competing products, instruction manuals, specifications, metadata, and any other type of information. The dialog prompts may provide one or more interfaces to accept search terms, which can then be forwarded to a search engine to provide search results to the user.

Figure 3:
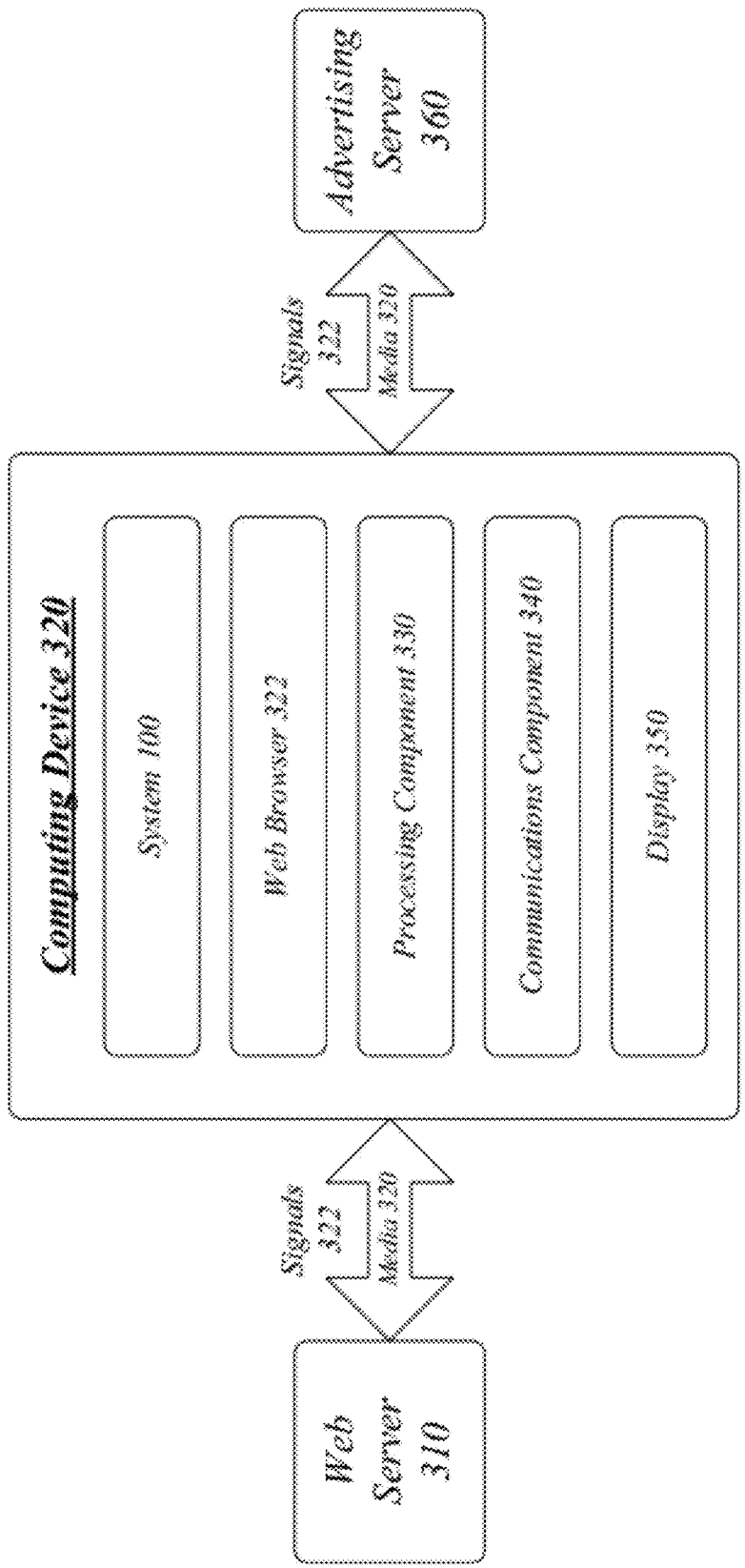
FIG. 3 illustrates an embodiment of a centralized system.

FIG. 3 illustrates a block diagram of a centralized system 300. The centralized system 300 may implement some or all of the structure and/or operations for the system 100 in a single computing entity, such as entirely within a single computing device 320.

The computing device 320 may execute processing operations or logic for the system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 320 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 320.

The computing device 320 may communicate with other devices 310, 360 over a communications media 320 using communications signals 322 via the communications component 340. For instance, assume the computing device 320 is a notebook computer communicating with a web server 310 (e.g., a media source 102-n) and an advertising server 350.

Further assume the computing device 320 establishes a wired or wireless connection via the communications media 320, and communicates with the web server 310 via a web browser 322 to retrieve a web page from the web server 310. The web page may comprise a product review for a new widget. The web page may include a link to a video (e.g., media file 104) about the new widget. When a user selects the link, the web browser 322 may begin downloading the video from the web server 310, and the media application 120 may begin presenting the video on a display 350 during or after downloading media file 104. A user pauses the media application 120 causing an image 108 to be presented on the display 350. The user selects an image portion 110 from the image 108 using the zoom controls 112, causing a zoom control directive 114 to be generated and sent to the zoom control component 122. The zoom control component 122 generates the enhanced magnified image 140 (e.g., using media file 106). The zoom information component 124 selects a target object 132 comprising the new widget using the selection rules 127, retrieves target information 126 for the new widget using the target information retrieval rules 128 and the target identifying information 129. For instance, the zoom information component 124 may retrieve target information 126 comprising advertising information for stores selling the new widget and pricing information as stored by the advertising server 360. The zoom information component 124 may then display the advertising information for the new widget beside the new widget within the enhanced magnified image 140. This zoom procedure may be repeated for different images 108 showing different perspective views of the target object 132, thereby allowing a viewer to magnify and inspect the target object 132 from different sides, angles and perspectives.

Figure 4:
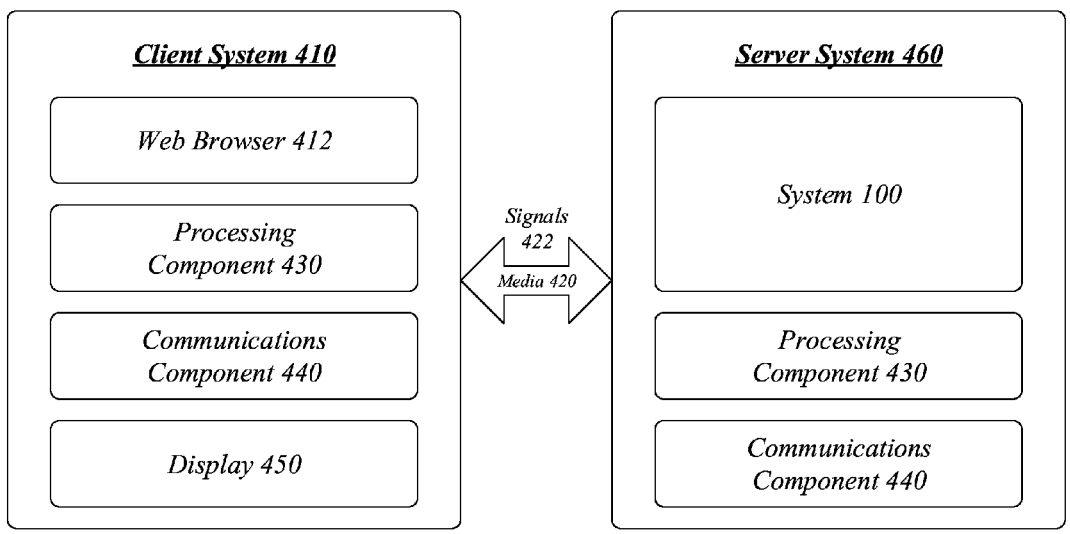
FIG. 4 illustrates an embodiment of a distributed system.

FIG. 4 illustrates a block diagram of a distributed system 400. The distributed system 400 may distribute portions of the structure and/or operations for the systems 100, 300 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 410 and the server system 460 may process information using the processing components 430, which are similar to the processing component 330 described with reference to FIG. 3. The client system 410 and the server system 460 may communicate with each over a communications media 420 using communications signals 422 via communications components 440, which are similar to the communications component 340 described with reference to FIG. 3.

In one embodiment, for example, the distributed system 400 may be implemented as a client-server system. A client system 410 may implement a web browser 412. A server system 460 may implement the media processing system 100. Additionally or alternatively, parts of the media processing system 100 may be implemented on each of the systems 410, 460 in varying combinations, such as client system 410 implementing media application 122 and the server system 460 implementing datastore 125, for example.

In various embodiments, the client system 410 may comprise or employ one or more client computing devices and/or client programs that operate to perform various methodologies in accordance with the described embodiments. For instance, the client system 410 may implement a web browser 412 that may access application and services provided by the media processing system 100 as implemented by the server system 460.

In various embodiments, the server system 460 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 430 may include, for example, stand-alone and enterprise-class server computers operating a server OS such as a MICROSOFT® OS, a UNIX® OS, a LINUX® OS, or other suitable server-based OS. The server system 440 may implement some or all of the media processing system 100, which can be accessed via the web browser 412 and the communications media 420 and signals 422.

Figure 5:
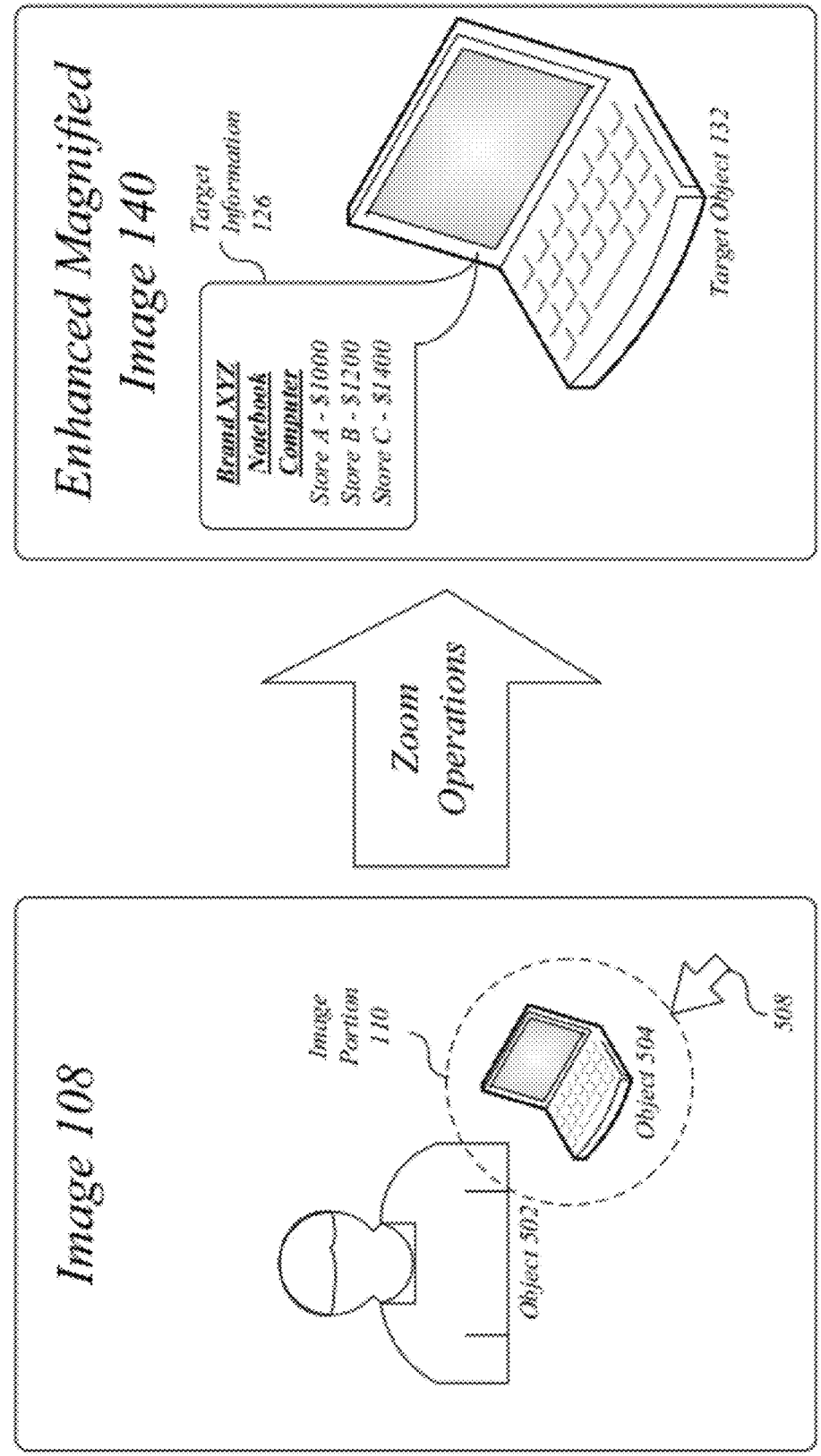
FIG. 5 illustrates an embodiment of a first logical view.

FIG. 5 illustrates an embodiment of a logical view 500 comprising an image 108 and an enhanced magnified image 140 having a target object 132 and target information 126. As shown in FIG. 5, an image 108 may comprise multiple objects, including an object 502 and an object 504. Assume a user selects an image portion 110 having the object 504 via a pointing device 508. The zoom control component 122 may perform zoom operations to magnify the image portion 110 to form the enhanced magnified image 140. The zoom information component 124 may identify the object 504 as a target object 132, retrieve target information 126 from the datastore 125 and/or the advertising server 360, and display the target information 126 adjacent to the target object 132.

Figure 6:
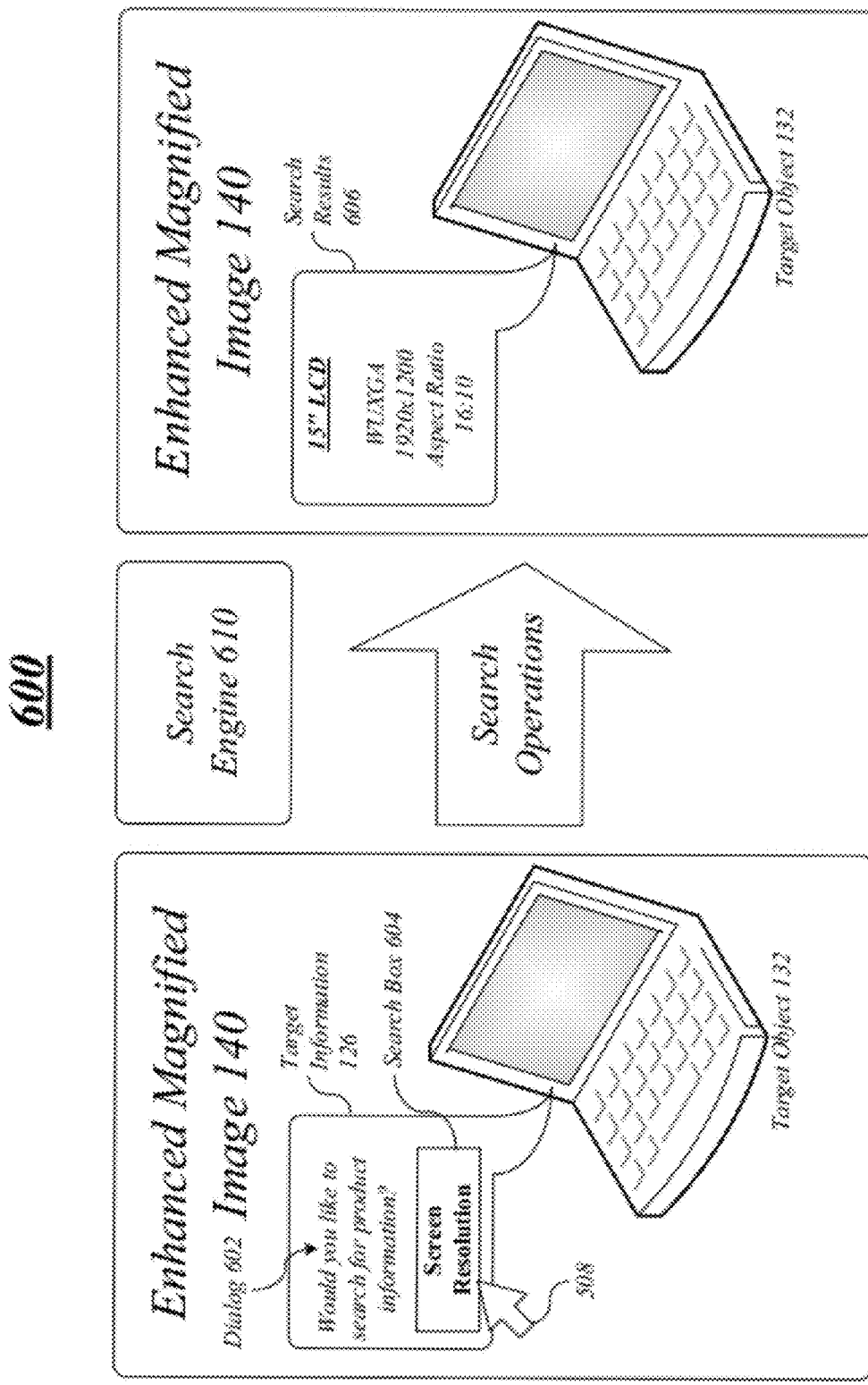
FIG. 6 illustrates an embodiment of a second logical view.

FIG. 6 illustrates an embodiment of a logical view 600 comprising an enhanced magnified image 140 having a target object 132 and target information 126. As shown in FIG. 6, the enhanced magnified image 140 may further present target information 126 comprising a dialog 602 prompting user commands from a user. The dialog 602 may comprise a request in the form of text, such as "Would you like to search for product information?" and a search box 604. The search box 604 may be selected via the pointing device 508 and a user may enter search terms related to the target object 132, such as "Screen Resolution." The zoom information component 124 may receive the search terms, forward them to a search engine 610, retrieve search results 606 from the search engine 610, and present some or all of the search results 606 in the enhanced magnified image 140. The search engine 610 may be accessed via an internal or external application program interface (API), for example. In this manner, the target information 126, the dialog 602 and the search box 604 may operate as a search portal triggered by zoom operations of the media processing system 100.

Figure 7:
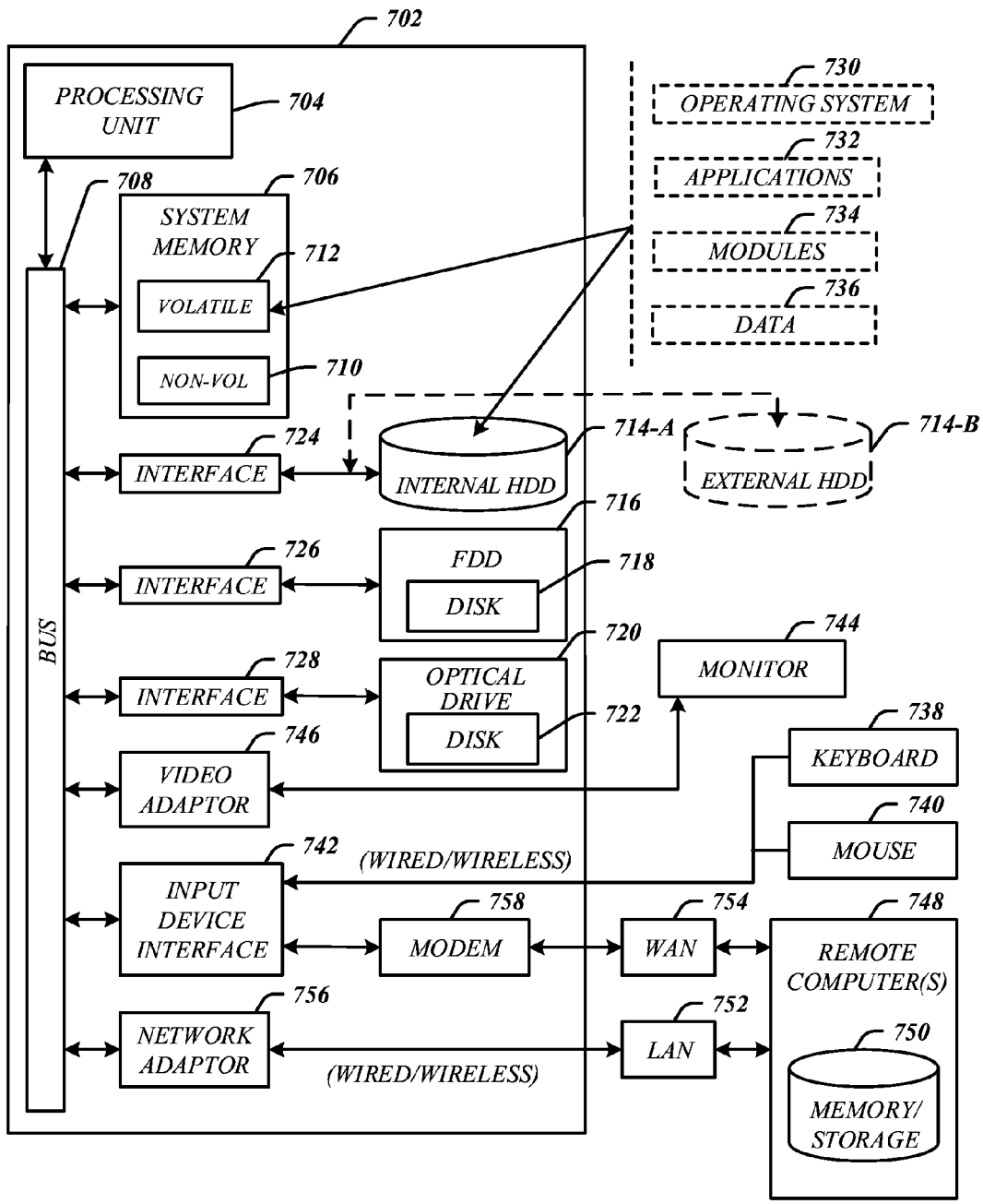
FIG. 7 illustrates an embodiment of a computing architecture.

FIG. 7 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714-A, an external HDD 714-B (collectively, the HDD 714), a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

The one or more application programs 732, other program modules 734, and program data 736 can include, for example, the media processing system 100, the zoom controls 112, the media application 120, the zoom control component 122, the zoom information component 124, and other software elements for the media processing system 100.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, finger gestures, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
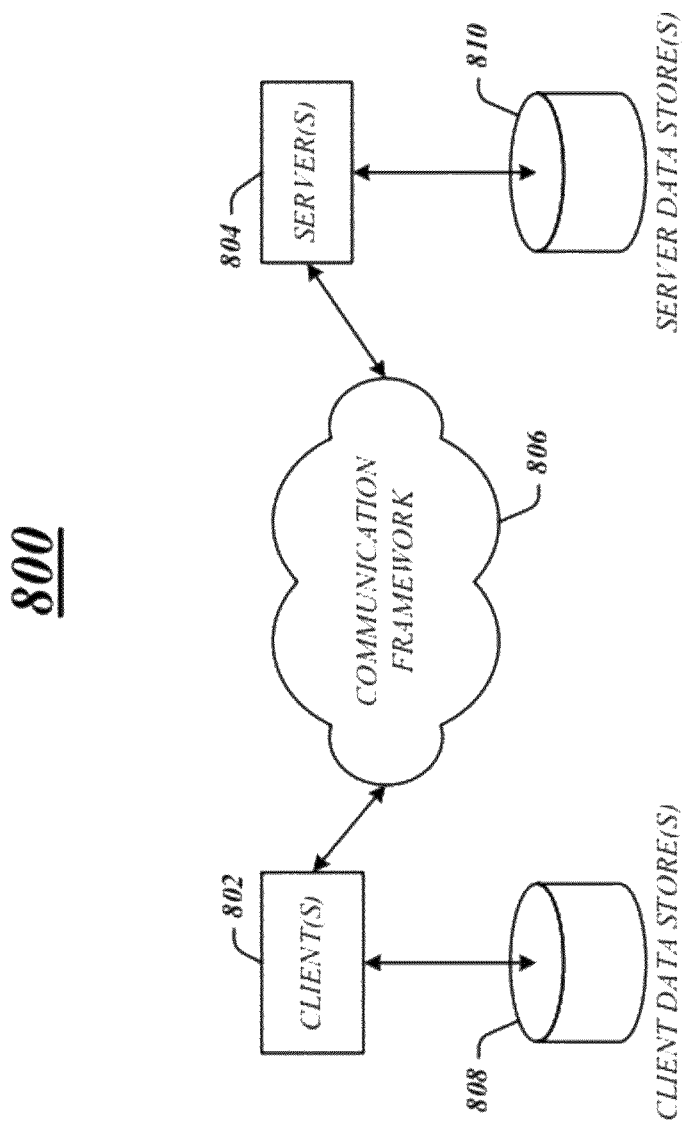
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 300, 400 and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
 presenting video information including images having a first video resolution level on a display;
 receiving a pause control directive and pausing the video information on an image;
 receiving a zoom control directive to magnify an image portion of the image; and
 in response to receiving the zoom control directive:
  replacing the image at the first video resolution level with a second version of the image having a higher video resolution level;
  magnifying the image portion in the second version of the image to form an enhanced magnified image using image scaling;
  detecting a plurality of objects within the enhanced magnified image;
  automatically selecting one of the detected plurality of objects to be a selected target object;
  retrieving target information for the selected target object within the enhanced magnified image based on a set of target information retrieval rules identifying a type of information to retrieve and an associated presentation format for displaying the information; and
  presenting retrieved target information about the enhanced magnified image on the display.

2. The method of claim 1, comprising selecting a target object presented within the enhanced magnified image based on a set of selection rules.

3. The method of claim 1, comprising presenting a user interface view to request selection of a target object presented within the enhanced magnified image.

4. The method of claim 1, comprising selecting a target object presented within the enhanced magnified image based on a selection control directive.

5. The method of claim 1, comprising presenting a user interface view to request retrieval of target information about a selected target object presented within the enhanced magnified image.

6. The method of claim 1, comprising retrieving target information for a selected target object within the enhanced magnified image based on the set of target information retrieval rules and identifying information for the target object.

7. The method of claim 1, comprising retrieving target information for a selected target object within the enhanced magnified image, the target information comprising an advertisement related to the target object, metadata for the target object, or a product description for the target object.

8. The method of claim 1, comprising retrieving target information for a selected target object within the enhanced magnified image from a local datastore or a remote datastore.

9. An article comprising a computer readable storage device containing instructions that when executed enable a system to
 present video information including images having a first video resolution level on a display;
 receive a pause control directive and pause the video information on an image;
 receive a zoom control directive to magnify a portion of the image; and
 in response to receiving the zoom control directive, to:
  replace the image at the first video resolution level with a second version of the image having a higher video resolution level;
  magnify a portion of the second version of the image in response to the zoom control directive using image scaling;
  detect a plurality of objects within the enhanced magnified image;
  automatically select one of the detected plurality of objects to be a selected target object;
  retrieve target information for the selected target object within the enhanced magnified image based on a set of target information retrieval rules identifying a type of information to retrieve and an associated presentation format for displaying the information; and
  present retrieved target information about the magnified portion of the image on the display.

10. The article of claim 9, further comprising instructions that when executed enable the system to select a target object presented within the magnified portion of the image based on a set of selection rules.

11. The article of claim 9, further comprising instructions that when executed enable the system to retrieve target information for a selected target object within the magnified portion of the image, the target information comprising an advertisement related to the target object, metadata for the target object, or a product description for the target object.

12. An apparatus, comprising:
a media application that when executed by a processor is operative to present video information including images having a first video resolution level on a display, the media application comprising:
a zoom control component operative to receive a pause control directive and pause the video information on an image, receive a zoom control directive to magnify an image portion of the image, and in response to receiving the zoom control directive, to: replace the image at the first video resolution level with a second version of the image having a higher video resolution level, magnify the image portion of the second version of the image to form an enhanced magnified image using image scaling, detect a plurality of objects within the enhanced magnified image, automatically select one of the detected plurality of objects to be a selected target object, and retrieve target information for the selected target object within the enhanced magnified image based on a set of target information retrieval rules identifying a type of information to retrieve and an associated presentation format for displaying the information.

13. The apparatus of claim 12, comprising a zoom information component operative to present retrieved target information about a target object within the enhanced magnified image on the display.

14. The apparatus of claim 12, comprising a zoom information component operative to select a target object presented within the enhanced magnified image, and retrieve target information for a selected target object within the enhanced magnified image based on the set of target information retrieval rules.

15. The apparatus of claim 12, comprising a zoom information component operative to retrieve target information for a selected target object within the enhanced magnified image based on identifying information for the target object.

\* \* \* \* \*